United States Patent [19]

Shahidi et al.

[11] 3,992,275

[45] Nov. 16, 1976

[54] LOW GLOSS ULTRAVIOLET CURABLE COATINGS UTILIZING α,α,α-TRICHLOROTOLUENE AS A PHOTOINITIATOR

[75] Inventors: Iraj K. Shahidi, Florham Park; Kenneth J. Zeliznak, Elizabeth, both of N.J.

[73] Assignee: Celanese Corporation, New York, N.Y.

[22] Filed: Nov. 25, 1974

[21] Appl. No.: 526,656

[52] U.S. Cl. .......................... 204/159.15; 96/115 P; 204/159.18; 204/159.23; 204/159.24; 260/837 R; 526/320; 526/328

[51] Int. Cl.² .................... C08F 8/00; C08F 2/46; C08F 4/00

[58] Field of Search ................ 204/159.23, 159.15, 204/159.24; 96/115 P

[56] References Cited

UNITED STATES PATENTS

| | | | |
|---|---|---|---|
| 3,251,759 | 5/1966 | Anderson | 204/159.23 |
| 3,661,614 | 5/1972 | Bassemir et al. | 204/159.23 |
| 3,759,807 | 9/1973 | Osborn et al. | 204/159.23 |

Primary Examiner—Richard B. Turer

[57] ABSTRACT

The use of α,α,α, trichlorotoluene as a photoinitiator in ultraviolet curable coating compositions is disclosed. This initiator is uniquely suited to produce ultraviolet coatings which exhibit low gloss properties.

8 Claims, No Drawings

LOW GLOSS ULTRAVIOLET CURABLE COATINGS UTILIZING α, α, α-TRICHLOROTOLUENE AS A PHOTOINITIATOR

BACKGROUND OF THE INVENTION

This invention relates to ultraviolet curable coating compositions and to a method for preparing and curing same. More particularly, this invention relates to a method for obtaining low gloss films by the ultraviolet radiation curing process.

Clear or pigmented coating compositions having low gloss are desirable in many applications, particularly in the furniture finishing industry. Most often low gloss has been achieved by the incorporation of compounds such as calcium stearate, zinc stearate, aluminum rosinate and the various aluminum esters, as well as the various talcs, clays, and the like, into ultraviolet curing systems.

These materials, however, are of only limited usefulness in ultraviolet curing applications, due to the blocking effect which they exhibit on ultraviolet rays. Thus, when standard ultraviolet curable coatings are compounded with these materials, cure properties are reduced and cure times extended. In fact, in some cases the resulting coatings — regardless of the ultraviolet exposure times — simply will not cure to a satisfactory degree.

It is an object of this invention to prepare ultraviolet coatings which may be cured to a low gloss by the use of ultraviolet light. It is another object of this invention to prepare low gloss ultraviolet curable compositions which exhibit cure rates equivalent to those of standard high gloss ultraviolet curable coatings.

These and other objectives are obtained by preparing the compositions of the instant invention.

SUMMARY OF INVENTION

This invention basically involves the discovery that ultraviolet curable coating compositions prepared in the presence of about 0.1 to 30 percent, by weight, based upon the total ultraviolet curable composition of α,α,α, trichlorotoluene, produce finishes which, when cured by ultraviolet radiation, are low in gloss, and cure at essentially the same rate as non-modified ultraviolet curable systems.

DESCRIPTION OF INVENTION

The ultraviolet curable compositions of the instant invention contain from about 40 to about 100 percent, by weight, based upon the total curable composition, of an alpha beta ethylenically unsaturated vinyl polymerizable compound containing at least two vinyl polymerizable groups per molecule. Includes are unsaturated esters of polyols and particularly such esters of the alpha methylene carboxylic acids, e.g., ethylene diacrylate, diethylene glycol diacrylate, glycerol diacrylate, glycerol triacrylate, ethylene dimethacrylate, 1,3-propanediol dimethacrylate, 1,2,4-butanetriol trimethacrylate, 1,4-cyclohexanediol diacrylate, 1,4-benzenediol dimethacrylate, pentaerythritol tri- and tetraacrylate and methacrylate, trimethylolpropane triacrylate, trimethylolethane triacrylate, dipentaerythritol hexacrylate, tripentaerythritol octaacrylate, sorbitol hexacrylate, 1,3-propanediol diacrylate, 1,5-pentanediol dimethacrylate, hexanediol diacrylate, the bis-acrylates and methacrylates of polyethylene glycols of a molecular weight of 200–1500, and the like; unsaturated amides, particularly those of the alpha methylene carboxylic acids, especially those of alpha, omega-diamines and oxygen-interrupted omega-diamines, such as methylene bis-acrylamide, methylene bis-methacrylamide, ethylene bis-methacrylamide, 1,6-hexamethylene bis-acrylamide, diethylene triamine tris-methacrylamide, bis(gammamethacrylamidopropoxy)ethane, beta-methacrylamidoethyl methacrylate, N-beta-hydroxy-ethyl-beta-(methacrylamido) ethyl acrylate, and N,N-bis(beta-methacryloxethyl) acrylamide; vinyl esters such as divinyl succinate, divinyl adipate, divinyl phthalate, divinyl terephthalate, divinyl benzene-1,3-disulfonate, and divinyl butane-1,4-disulfonate; styrene and derivatives thereof and unsaturated aldehydes, such as sorbaldehyde (hexadienal). An outstanding class of these preferred addition polymerizable components are the esters and amides of alpha-methylene carboxylic acids and substituted carboxylic acids with polyols and polyamides wherein the molecular chain between the hydroxyl and amino groups is solely carbon or oxygen-interrupted carbon.

The polyethylenic unsaturation can be present as a substituent attached to a preformed polymer resin, such as an alkyd, a polyester, a polyamide, or a vinyl homo- or copolymer. Also included are polymers containing maleic and fumaric acids or esters, as well as polymeric unsaturated materials prepared by reacting vinyl hydroxy or carboxy materials with polyepoxides, e.g., acrylic acid with the diglycidyl ether of bisphenol A. Also included are polymers such as polyvinyl acetate/acrylate, cellulose acetate/acrylate, cellulose acetate/methacrylate, N-acryloxymethylpolyamide, N-methacryloxymethylpolyamide, allyloxymethylpolyamide, etc..

In addition to the aforementioned polyfunctional polymerizable compounds, compounds containing a single polymerizable ethylenically unsaturated group of the structure

can also be utilized. In addition to traditional "monomers", as described hereafter, the monounsaturated compounds may be polymeric materials, as previously described, containing on the average a single site of unsaturation on each polymer molecule. These monomers can be aliphatic, aromatic, cycloaliphatic or any variant thereof. Among the monomers are included styrene, 4-methylstyrene, alphamethylstyrene, and the like; acrylic acid and its nitrile, amide and $C_1$–$C_{12}$ alkyl, aryl, or hydroxy alkyl derivatives, such as acrylonitrile, ethylacrylate, 2-ethylhexyl acrylate, butyoxyethoxyethyl acrylate, hydroxyethyl acrylate, as well as others; the vinyl halides, such as vinyl chloride, vinylidene chloride, and the like; vinyl ketones such as vinyl phenyl ketone, vinyl methyl ketone, alphachlorovinyl methyl ketone, and the like; the vinyl thioethers such as vinyl ethyl sulfide, vinyl p-tolylsulfide, divinyl sulfide, and the like. Other monomers include vinyl ethyl sulfone, vinyl ethyl sulfoxide, vinyl sulfonic acid, sodium vinyl sulfonate, vinyl sulfonamide, vinyl pyridine, N-vinyl pyrrolidone, N-vinyl carbazole, and the like. Generally any alpha beta ethylenically unsaturated monomer which does not interfere with the ultraviolet curing mechanism may be utilized, and as such, these monomers are well known in the art.

These compounds may be added in amounts up to about 60 percent, by weight, based upon the total curable composition, preferably about 10 to about 30 percent.

The instant invention can also contain up to about 60 percent, by weight, based upon the total curable system, of a polymeric material containing no polymerizable unsaturation. Among the polymers are the polyolefins and modified polyolefins, the vinyl polymers, the polyethers, the polyesters, the polylactones, the polyamides, the polyurethanes, the polyureas, the polysiloxanes, the polysulfides, the polysulfones, the polyformaldehydes, the phenol-formaldehyde polymers, the natural and modified natural polymers, the heterocyclic polymers, and the like.

Illustrative of these polymers are the acrylic polymers such as poly(acrylic acid), poly(methyl acrylate), poly(ethyl acrylate), poly(methacrylic acid), poly(methyl methacrylate), poly(ethyl methacrylate); poly(vinyl chloride); poly(vinyl alcohol); poly(ethylene/-propylene/5-ethylidenebicyclo[2.2.1]-hept-2-ene); polyethylene; polypropylene; synthetic rubbers, e.g., butadiene/acrylonitrile copolymers and chloro-2-butadiene 1,3 polymers; the polyesters, copolyesters, polyamides and copolyamides, such as polycaprolactone, poly(caprolactone/vinyl chloride) poly(ethylene glycol terephthalate), poly(hexamethylene succinate), poly(hexamethylene maleate), poly(hexamethylene carbonate), poly(caprolactam), poly(hexamethylene adipamide), and the like; the polyethers such as poly(-glutaraldehyde), polyethylene oxide, polypropylene oxide, poly(tetrahydrofuran), polycyclohexene oxide, copolymers of ethylene oxide and propylene oxide with starters containing reactive hydrogen atoms such as the mixed copolymers using ethylene glycol, glycerol, sucrose, etc., as the starter; vinylidene polymers and copolymers, e.g., vinylidene chloride/acrylonitrile, vinylidene chloride/methacrylate and vinylidene chloride/vinyl acetate polymers; ethylene/vinyl acetate copolymers; the polyureas and polyurethanes, such as described in *Polyurethanes: Chemistry and Technology*, Volumes I and II, Sanders and Frisch, published by Interscience Publishers; the polycarbonates; polystyrenes; polyvinyl acetals, e.g., polyvinyl butyral, polyvinyl formal; the cellulose ethers, e.g., methyl cellulose, ethyl cellulose, and benzyl cellulose; the cellulose esters, e.g., cellulose acetate, cellulose acetate succinate and cellulose acetate butyrate; as well as the natural and modified natural polymers such as gutta percha, cellulose, gelatin, starch, silk, wool, and the like; the siloxane polymers and copolymers; the formaldehyde polymers such as polyformaldehyde; formaldehyde resins such as phenol-formaldehyde, melamine-formaldehyde, urea-formaldehyde, aniline-formaldehyde and acetone-formaldehyde; phenolic resins and the like.

If desired, the photo-polymerizable compounds can also contain immiscible polymeric or nonpolymeric organic or inorganic fillers or reinforcing agents, e.g., the organophilic silicas, bentonites, silica, powdered glass, colloidal carbon, as well as various types of dyes and pigments, in varying amounts. The fillers are useful in improving the strength, reducing tack and as coloring agents in the coatings of this invention. However, the amount of such fillers which must be added in order to produce the low gloss of the compositions of the instant invention is substantially reduced or eliminated by the use of $\alpha,\alpha,\alpha$,trichlorotoluene, as set out hereinafter.

This invention involves the discovery that by using $\alpha,\alpha,\alpha$, trichlorotoluene as a photosensitizer in amounts ranging from 0.1 to 30 percent, preferably 1 to 10 percent, based upon the curable composition weight, it is possible to prepare ultraviolet curable compositions which, when subject to ultraviolet light, cure to a low gloss film.

Of course, other photosensitizers may be utilized in combination with the $\alpha,\alpha,\alpha$, trichlorotoluene, although they are not necessary. In any event, the amounts of these added photosensitizers can be reduced substantially from the amounts previously required for the curing of prior art low gloss ultraviolet coatings.

These photosensitizers fall into many classes and include compounds such as benzoin derivatives, as disclosed in German Pat. No. F523401VC/396, acetophenone, propiophenone, xanthone, fluorenone, benzaldehyde, fluorene, anthraquinone, triphenylamine, carbazole, 3- or 4-methylacetophenone, 3- or 4-pentylacetophenone, 3- or 4-methoxyacetophenone, 3- or 4-bromoacetophenone, 3- or 4-allylacetophenone, p-diacetylbenzene, 3- or 4-methoxybenzophenone, 3- or 4-methylbenzophenone, 3- or 4-chlorobenzophenone, 4,4'-dimethoxybenzophenone, 4-chloro-4'-benzylbenzophenone, 3-chloroxanthone, 3,9-dichloroxanthone, thioxanthone, and chloronated thioxanthones, 3-chloro-8-nonylxanthone, 3-methoxyanthone, 3-iodo-7-methoxyxanthone, and the like.

Also included are the acetophenone photosensitizers of the type described in U.S. Pat. No. 3,715,293, having the structure

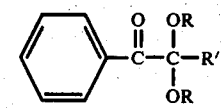

wherein R is alkyl of from 1-8 carbon atoms, or aryl with 6 carbon atoms, and R' is hydrogen, alkyl of from 1-8 carbon atoms, aryl of from 6-14 carbon atoms or cycloalkyl of 5-8 carbon atoms.

The alkylphenone photosensitizers having the formula

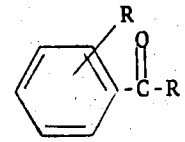

the benzophenone type photosensitizers having the formula

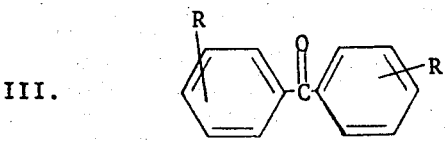

the tricyclic fused ring type having the formula

IV. 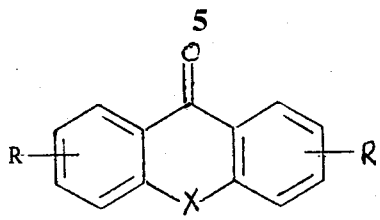

and the pyridyl type having the formula

V. 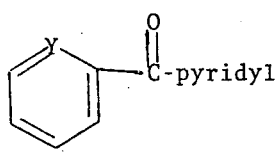

wherein the various substituents are as further described in U.S. Pat. No. 3,759,807, are also included.

Other photosensitizers include 1- and 2-chloroanthraquinone, 2-methylanthraquinone, 2-tertiary butyl anthraquinone, octamethylanthraquinone, 1-4-napthoquinone, 9-10-phenanthrenequinone, 1,2-benzanthraquinone, 2-3-benzanthraquinone, 2-methyl-1,4-napthoquinone, 2,3-dichloronaphthoquinone, 1-4-dimethylanthraquinone, 2-3-dimethylanthraquinone, 2-phenylanthraquinone, 2-3-diphenylanthraquinone, sodium salts of anthraquinone alphasulfonic acid, 3-chloro-2-methylanthrquinone, and the like. Other photoinitiators which are also useful are described in U.S. Pat. No. 2,760,863 and include vicinal ketaldonyl compounds, such as diacetyl benzyl, etc., alpha ketadonyl alcohols, such as benzoin, pivaloin, etc., acyloin ethers, e.g., benzoin methyl and ethyl ethers, etc., alpha hydrocarbon substituted aromatic acyloins, including alphamethyl benzoin, alphaallyl benzoin, and alpha phenyl benzoin. Also included are the diacylhalomethanes, corresponding to one of the general formulas:

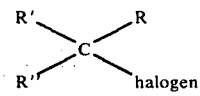

and

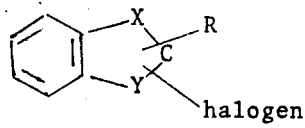

wherein halogen represents a halogen atom such as chlorine or bomine; R represents a hydrogen atom, a chlorine or bromine atom, or an acetyloxy group; R' and R'' (same or different) represent a benzoyl group, a nitrobenzoyl group, a dimethylamino benzoyl group, a phenyl sulfonyl group, a carboxy phenyl sulfonyl group, a methylphenyl sulfonyl group, or a napthoyl group; and X and Y (same or different) represent a carbonyl group or a sulfonyl group. Included are 2-bromo-1,3-diphenyl-1,3-propane dione; 2,2-dibromo-1,3-indane dione; 2,2-dibromo-1,3-diphenyl-1,3-propane dione; 2-bromo-2-(phenylsulfonyl) acetal phenone) and the like, as further described in U.S. Pat. No. 3,615,455.

Other photoinitiators are cataloged by G. Delzenne in *Industrie Cimique Belge*, 24 (1959), 739–764. Most preferred among the added initiators are benzoin and its alkyl esters, benzophenone and its derivatives, as in Formula III, xanthone, thioxanthanones and chlorinated thioxanthones acetophenone derivatives, as set out in formula I, and halogenated, aliphatic and aromatic polychlorinated biphenyls and polyphenyls.

These added photosensitizers can be added in an amount of up to about 15 percent, by weight, based upon the total curable system, preferably up to about 5 percent.

Although not required, certain organic amines can be added to the photosensitizers above-described to further enhance the cure rate of the compositions of the instant invention in amounts up to about 500 percent, by weight, of the photosensitizer, preferably up to about 50 percent, by weight. The amines can be primary, secondary, or tertiary, and can be represented by the general formula:

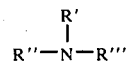

wherein R' and R'' taken singly can be hydrogen linear or branched alkyl having from 1 to about 12 carbon atoms, linear or branched alkenyl having from 2 to about 12 carbon atoms, cycloalkyl having from 3 to about 10 ring carbon atoms, cycloalkenyl having from 3 to about 10 ring carbon atoms, aryl having from 6 to about 12 ring carbon atoms, alkaryl having 6 to about 12 ring carbon atoms; R''' has the same meaning as R' and R'' with the exception that it cannot be hydrogen and that it cannot be aryl when both R' and R'' are aryl. When taken together R'' and R''' can be a divalent alkylene group ($-C_nH_{2n}-$) having from 2 to about 12 carbon atoms, a divalent alkenylene group ($-C_nH_{2n-1}-$) having from 3 to about 10 carbon atoms, a divalent alkadienylene group ($-C_nH_{2n-2}-$) having from 5 to about 10 carbon atoms, a divalent alkatrienylene group ($-C_nH_{2n-3}-$) having from 5 to about 10 carbon atoms, a divalent alkyleneoxyalkylene group ($-C_xH_{2x}OC_xH_{2x}-$) having a total of from 4 to about 12 carbon atoms, or a divalent alkyleneaminoalkylene group

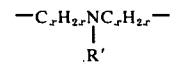

having a total of from 4 to about 12 carbon atoms. As previously indicated, the amines can be substituted with other groups; thus, the R', R'' and R''' variables, whether taken singly or together, can contain one or more substituents thereon. The nature of such substituents is generally not of significant importance and any substituent group can be present that does not exert a pronounced deterrent effect on the ultraviolet crosslinking reaction.

Illustrative of suitable organic amines one can mention are methylamine, dimethylamine, trimethylamine, diethylamine, triethylamine, propylamine, isopropylamine, diisopropylamine, triisopropylamine, butylamine, tributylamine, t-butylamine, 2-methylbutylamine, N-methyl-N-butylamine, di-2-methylbutylamine, trihexylamine, tri-2-ethylhexylamine, dodecylamine, tridodecylamine, tri-2-chloroethylamine, di-2-bromoethylamine, methanolamine, ethanolamine, diethanolamine, triethanolamine, methyldiethanolamine, dimethylethanolamine, isopropanolamine, propanolamine, diisopropanolamine, triisopropanolamine, butylethanolamine, dihexanolamine, 2-methoxyethylamine, di-2-ethylhexylamine, tri-2-ethoxyethylamine, 2-hydroxyethyldiisopropylamine, 2-aminoethylethanolamine, allylamine, butenylamine, dihexadienylamine, cyclohexylamine, tricyclohexylamine, trimethylcyclohexylamine, bis-methylcyclopentylamine, tricyclohexenylamine, tricyclohexadienylamine, tricyclopentadienylamine, N-methyl-N-cyclohexylamine, N-2-ethylhexyl-N-cyclohexylamine, diphenylamine,-phenyldimethylamine, methylphenylamine, ditolylamine, trixylyl-amine, tribenzylamine, triphenethylamine, benzyldimethylamine, benzyldihexylamine, trischlorophenethylenimine, N-methylethylenimine, N-cyclohexylethylenimine, piperidine, N-ethylpiperidine, 2-methylpiperidine, 1,2,3,4-tetrahydropyridine, 1,2-dihydropyridine, 2-, 3- and 4- picoline, morpholine, N-methyl morpholine, N-2-hydroxyethylmorpholine, N-2-ethoxyethylmorpholine, piperazine, N-methylpiperazine, N,N''-dimethylpiperazine, 2,2-dimethyl-1,3-bis[3 (N-morpholinyl)-propionyloxy]propane, 1,5-bis[3-(N-morpholinyl)-propionyloxy]diethyl ether, and the like. The preferred organic amines are the tertiary amines, with the alkanol amines being most preferred.. The specific preferred amine activators are tri-ethanolamine, morpholine and methyldiethanolamine.

The compositions of the instant invention after being prepared in the ratios as set out above can be applied to the material to be coated by conventional means, including brushing, spraying, dipping, curtain and roll coating techniques, and may, if desired, be dried under ambient or oven conditions to provide coating films on the substrate. The substrate can be of any composition, e.g., wood, metal, paper, plastic fabric, fiber, ceramic, concrete, plaster, glass, etc., although the low gloss compositions of this invention find particular utility in furniture finishing applications where extremely low gloss finishes are desirable.

Typically a mixture of the compositions described above in combination with $\alpha,\alpha,\alpha$, trichlorotoluene and, where utilized, the amine activator, is prepared and the composition applied to the desired wood substrate. It is then exposed to electromagnetic radiation having wave lengths of above about 2000 Angstrom units, preferably from about 2000 up to about 5000 Angstroms. Exposure should be from a source located about 1 to 5 inches from the coating for a time sufficient to cause crosslinking of the composition and can range from about 0.1 seconds up to about 1 min./linear ft. Generally, the light radiation will have power of about 200 watts per linear inch.

The light radiation can be ultraviolet light generated from low, medium and high pressure mercury lamps. This equipment is readily available and its use is well known to those skilled in the art of radiation chemistry. Other sources include electron beam radiation, plasma arc, laser beams, etc.

In the following examples all parts and percentages are by weight, unless otherwise indicated.

EXAMPLES 1–3.

Blends of 95 parts of hexanediol diacrylate with, respectively, 5 parts benzoin isobutyl ether (Example 1), 5 parts 2,2-diethoxyacetophenone (Example 2), and 5 parts $\alpha,\alpha,\alpha$, trichlorotoluene (Example 3) were prepared. Each blend was applied with a 1 mil Bird applicator to a Bonderite 1000 cold rolled steel panel, exposed to an Hanovia ultraviolet medium pressure mercury lamp at a belt speed of 10 f.p.m. for 200 watts/linear in. The following results were obtained:

|  | Degree of cure | Color | 20° Gloss |
|---|---|---|---|
| Example 1 | Good | Clear | 95.4 |
| Example 2 | Good | Clear | 86.5 |
| Example 3 | Good | Clear | 59.8 |

EXAMPLES 4, 5, 6, and 7.

The following blends were prepared:

|  | Ex. 4 | Ex. 5 | Ex. 6 | Ex. 7 |
|---|---|---|---|---|
| Reaction product at 60° C. of 1 mole of diglycidyl ether bisphenol A and 2 moles acrylic acid | 50 | 50 | 50 | 50 |
| Hexanediol acrylate | 10 | 10 | 10 | 10 |
| 2-ethylhexyl acrylate | 25 | 25 | 25 | 25 |
| Hydroxyethyl acrylate | 10 | 10 | 10 | 10 |
| Benzophenone | 5 |  |  |  |
| Benzoin isobutyl ether |  | 5 |  |  |
| 2,2-diethoxyacetophenone |  |  | 5 |  |
| $\alpha,\alpha,\alpha$ trichlorotoluene |  |  |  | 5 |

The following results were obtained utilizing the procedure set forth in Example 1:

|  | Ex. 4 | Ex. 5 | Ex. 6 | Ex. 7 |
|---|---|---|---|---|
| Color | Clear | Clear | Clear | Clear |
| Gloss 20° | 109 | 100.2 | 74.0 | 5.2 |
| Pencil hardness | 2H-3H | H-2H | F-H | F-H |
| Reverse impact (in./lbs.) | 12–16 | 4–8 | 4–8 | 16–20 |
| Conical bend Failure, ins.) | 6½'' | 3½'' | 3½'' | 3¾'' |
| MEK Rubs | >300 | >300 | >300 | >300 |

The above examples indicate clearly superior cure properties, and particularly, adhesion properties, obtained utilizing $\alpha,\alpha,\alpha$ trichlorotoluene.

What is claimed is:

1. An ultraviolet curable coating composition capable of producing low gloss coatings when cured by ultraviolet radiation, said coating based on the total weight of the curable composition, comprising about 40 to about 100 percent of an alpha beta ethylenically unsaturated vinyl polymerizable composition containing at least about two sites of vinyl polymerizable unsaturation, about 60 to about 0 percent, by weight, of another alpha beta ethylenically unsaturated vinyl polymerizable composition containing no more than about one site of vinyl unsaturation, the improvement of which comprises utilizing as a photoinitiator $\alpha,\alpha,\alpha$, trichlorotoluene.

2. The composition of claim 1 in admixture with up to about 15 percent, by weight, based on the curable composition, of another photoinitiator.

3. The composition of claim 1 in admixture with about 50 to about 500 percent, by weight, based on the photoinitiators, of an organic amine.

4. The composition of claim 3 wherein the organic amine is a tertiary alkanol amine.

5. The composition of claim 3 wherein the organic amine is selected from triethanol amine, morpholine, and methyldiethanol amine.

6. The composition of claim 2 wherein the other photoinitiator is selected from benzoin and its alkyl ethers, benzophenone and its derivatives, xanthone, thioxanthone, chlorinated thioxanthone, acetophenone derivatives and halogenated aliphatic and aromatic polychlorinated biphenyls and polyphenyls.

7. The composition of claim 1 in admixture with about 60 percent, by weight, based upon the total curable system, of a polymeric material containing no polymerizable unsaturation.

8. The composition of claim 1 wherein the alpha beta ethylenically unsaturated vinyl polymerizable composition, containing no more than one site of vinyl polyerizable unsaturation, is present at the 10–30 percent, by weight, level.

* * * * *